(No Model.)
A. GLASS & W. S. GRAFTON.
PAINTING MACHINE.
No. 497,318. Patented May 16, 1893.
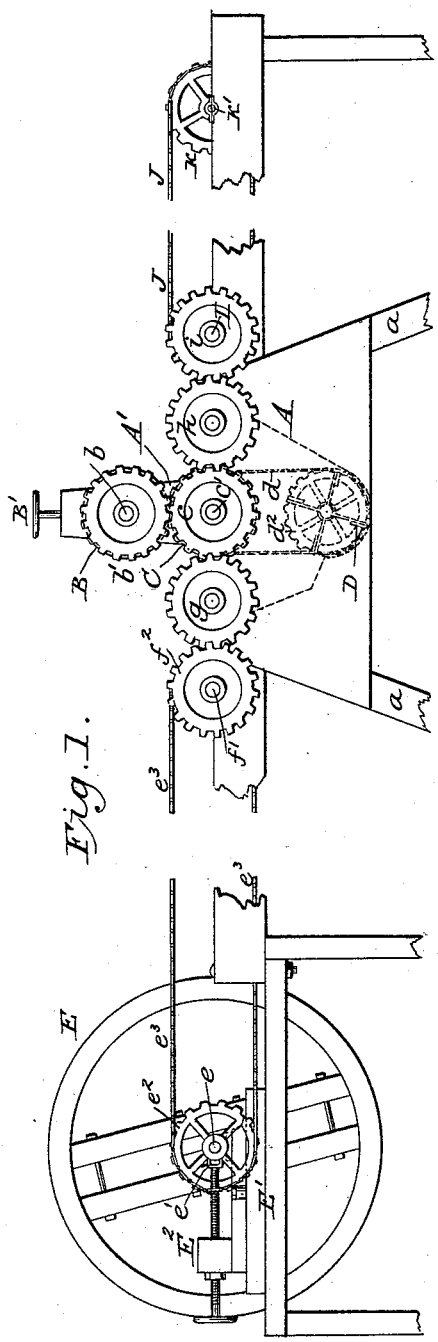
Fig. I.
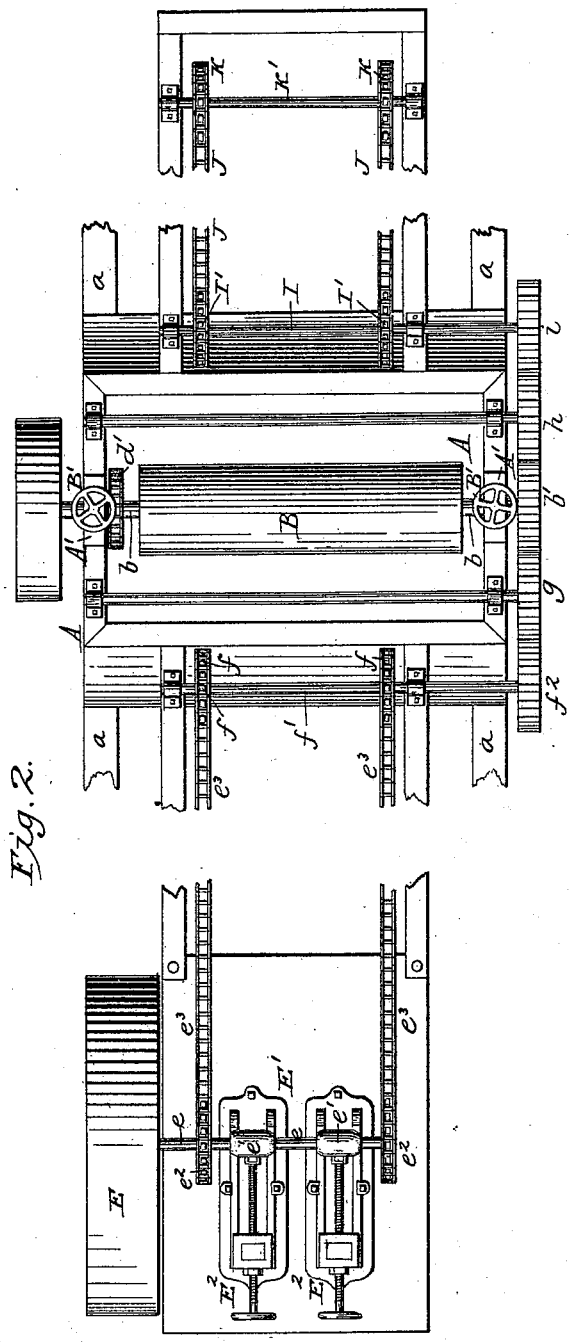
Fig. 2.
WITNESSES:
B. Washington Miller
Baltus DeLong
INVENTORS
ALEXANDER GLASS,
WILLIAM S. GRAFTON
BY
Baldwin, Davidson & Wight
ATTORNEYS

UNITED STATES PATENT OFFICE.

ALEXANDER GLASS, OF WHEELING, WEST VIRGINIA, AND WILLIAM S. GRAFTON, OF STEUBENVILLE, OHIO, ASSIGNORS TO THE WHEELING CORRUGATING COMPANY, OF WHEELING, WEST VIRGINIA.

PAINTING-MACHINE.

SPECIFICATION forming part of Letters Patent No. 497,318, dated May 16, 1893.

Application filed January 31, 1893. Serial No. 460,403. (No model.)

*To all whom it may concern:*

Be it known that we, ALEXANDER GLASS, residing at Wheeling, in the county of Ohio and State of West Virginia, and WILLIAM S. GRAFTON, residing at Steubenville, in the county of Jefferson and State of Ohio, citizens of the United States, have invented certain new and useful Improvements in Painting-Machines, of which the following is a specification.

The object of our invention is to provide a machine simple in construction and operation, for expeditiously and reliably painting, coloring or staining sheets of metal, &c.

Our improvements are shown in the accompanying drawings, in which—

Figure 1 is a side elevation, partly broken away, of the machine; and Fig. 2, a plan view thereof.

The painting, coloring or staining material is contained in a box or vat A, which may be supported on suitable standards $a$. Standards A′, secured to the vat frame are provided with bearings for the shaft $b$, of a roller B, which is provided with a cog wheel $b'$, meshing with a cog $c$, on the shaft $c'$, of a roller C. The rollers B and C, are in close proximity to each other, and their surfaces are adapted to revolve while in contact. They may be conveniently constructed of wood covered with muslin or other similar suitable material. The lower roll C, is partially immersed in the coloring material contained in the vat, and transfers the coloring material from its own surface to the surface of the roller B, which may be adjusted vertically by means of hand wheels B″, connected with the bearings of the shaft $b$.

An agitator D, located below the rolls B and C, is driven by a sprocket chain $d$, passing over a sprocket pulley $d'$, on the shaft $c'$, and over a sprocket $d^2$, on its own shaft; by this means, the paint is kept well mixed at all times.

In order to convey the sheets of metal to the painting apparatus, and carry them away from it, we provide endless carrying belts, ropes, or chains. A pulley E, may be belted to any suitable prime mover. Its shaft $e$, is supported in bearings $e'$, on a frame E′. The bearings may be adjusted horizontally by adjusting devices E². The shaft $e$, carries a pair of sprocket pulleys $e^2$, over which extend endless sprocket chains $e^3$, connected with sprocket pulleys $f$, on a shaft $f'$, mounted in bearings on the frame of the painting apparatus.

The shaft $f'$, carries a cog wheel $f^2$, gearing with a cog $g$, which meshes with the cog $c$, on the shaft of the roller C. On the other side of the apparatus, a cog $h$, gearing with the cog $c$, also gears with a cog $i$, on a shaft I, carrying sprocket pulleys I′, over which extend sprocket chains J, which pass around sprocket pulleys K, on a distant shaft K′. Motion is communicated from the shaft $e$, to the shaft $f'$, by the chains $e^3$, and by means of the gears $f^2$, $g$, $c$, &c., motion is communicated to the working parts of the painting apparatus and also to the chains J. The chains J, are employed to carry the plates to the painting rollers, while the chains $e^3$ are employed to convey them therefrom, or the chains $e^3$, may be used to feed the machine, while the chains J, may be employed to carry the painted plates to their destination.

We claim as our invention—

1. A painting machine comprising a vat, a pair of rollers geared together, an agitator within the vat and geared to the rollers, carriers on each side of the painting rolls and geared therewith, and means for operating the rolls and carriers.

2. A painting apparatus comprising painting rolls geared together, an agitator, sprocket gearing connecting the agitator with the painting rolls, endless carriers on opposite sides of the painting rolls, gearing connecting the carriers with the painting rolls, and means for driving the endless carrier on one side of the apparatus to convey motion to the painting rolls, agitator and endless carrier on the opposite side of the apparatus.

3. The combination of a vat, a painting roll partially immersed therein, an adjustable roll over the first mentioned roll and revolving in contact therewith, gearing connecting the two rolls, a revolving agitator within the vat below the rolls, sprocket gearing connecting the agitator with the rolls, endless carriers on opposite sides of the painting rolls, gearing connecting the shafts of the carriers with the painting rolls, a driving pulley, and means for adjusting the shaft of the driving pulley toward and from the painting rolls.

In testimony whereof we have hereunto subscribed our names.

ALEXANDER GLASS.
WILLIAM S. GRAFTON.

Witnesses:
 THOS. H. JONES,
 LIEU. J. MARSH.